Jan. 25, 1966  B. BERGHAUS  3,231,484
METHOD OF SUSTAINING A GLOW DISCHARGE IN A HIGH PRESSURE AREA
Filed Dec. 28, 1961  2 Sheets-Sheet 1
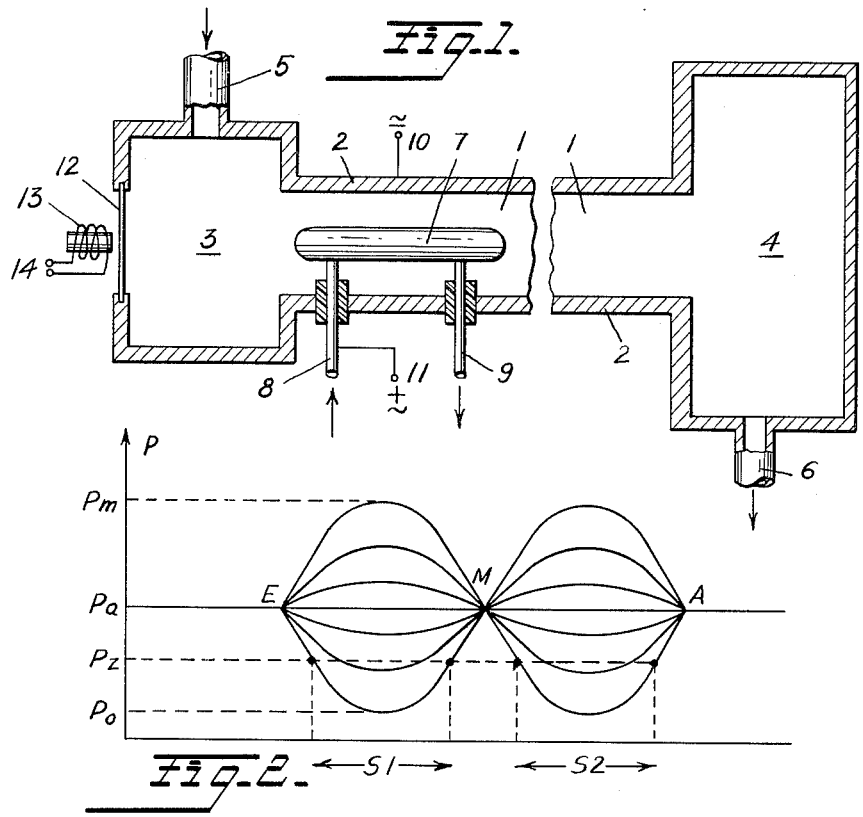
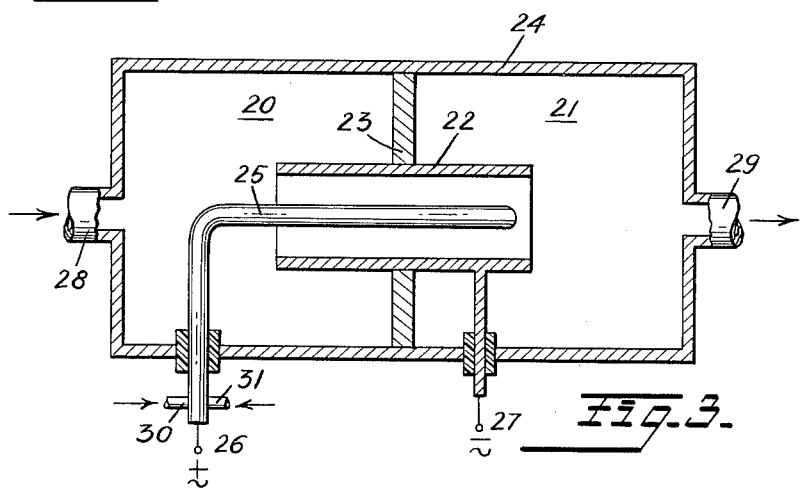
INVENTOR
*Bernhard Berghaus*
BY *Bacon & Thomas*
ATTORNEYS Jan. 25, 1966  B. BERGHAUS  3,231,484
METHOD OF SUSTAINING A GLOW DISCHARGE IN A HIGH PRESSURE AREA
Filed Dec. 28, 1961  2 Sheets-Sheet 2
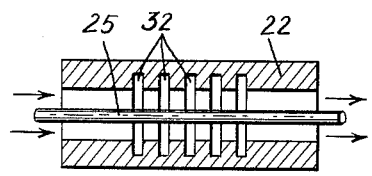
Fig. 4.
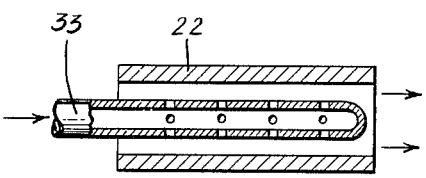
Fig. 5.
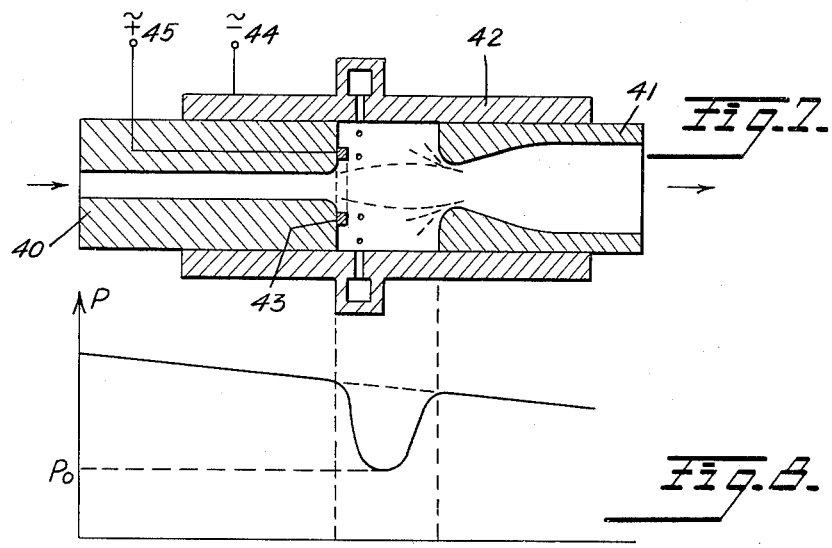
Fig. 7.
Fig. 8.
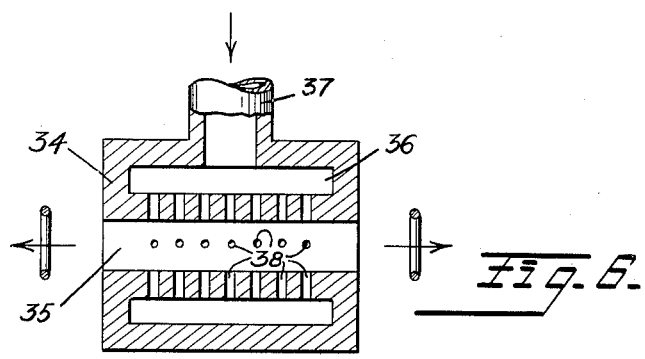
Fig. 6.
INVENTOR
*Bernhard Berghaus*
BY *Bacon & Thomas*
ATTORNEYS

3,231,484
METHOD OF SUSTAINING A GLOW DISCHARGE IN A HIGH PRESSURE AREA

Bernhard Berghaus, Zurich, Switzerland, assignor to Elektrophysikalische Anstalt Bernhard Berghaus, Vaduz, Liechtenstein, a corporation of Liechtenstein
Filed Dec. 28, 1961, Ser. No. 162,882
12 Claims. (Cl. 204—164)

This application is a continuation-in-part of application Serial No. 692,632, filed October 28, 1957, now abandoned.

The present invention relates to the performance of chemical and physical processes occurring under the action of a glow discharge in a gaseous medium containing the materials to be treated and, respectively, carrying them along in finely dispersed form.

Chemical and physical processes of this kind have been known in many varieties. In principle, they are all based on the fact that the reactants contained in, or carried in finely dispersed form by, the gaseous medium are separated by ionization, activation or dissociation during the glow discharge, into reactive components which will enter into the desired reaction, in conditions adapted to the process, either in the discharge zone or, in the majority of cases, only after leaving the discharge zone. In this manner, a variety of reactions may be performed in a single operation part of which could otherwise be obtained only with considerable technical outlay in a plurality of operational steps. Performance of chemical and physical processes under the action of a glow discharge therefore offers considerable advantages in many cases because it is possible, by means of a glow discharge, to produce direct separation of molecules or small particles into reactive components.

Despite these essential advantages of chemical and physical processes performed under the action of a glow discharge, processes of this type have not so far come into their own in industrial application but have been restricted to individual special fields of application.

This is due to the fact that, according to general belief held in the art, a glow discharge can be maintained only within a pressure range of approx. $10^{-3}$ mm. Hg to about 300 mm. Hg and that accordingly a chemical or physical process to be performed under the action of a glow discharge must necessarily take place under pressure lower than 30 mm. Hg.

In order to maintain a reduced pressure of less than 30 mm. Hg, and at the same time supplying the minimum throughput required for industrial application, however, such large pump units with such substantial mechanical equipment would be called for that the costs of a process performed at such reduced pressure are largely determined by investment and operating costs of these pump units so that the process becomes uneconomical and the advantages of processing under the action of a glow discharge are eliminated.

This is readily understood if it is remembered that a pump unit operating at a pressure of, say 7.5 mm. Hg must, in order to achieve a certain throughput, theoretically deliver hundreds of times the volume which would be necessary to achieve the same throughput at atmospheric pressure. Practically the factor by which the volume to be conveyed at a certain reduced pressure must be larger with the same throughput than the volume conveyed at atmospheric pressure, is somewhat higher than the theoretical value, depending on the design of the pump unit and on the underpressure to be obtained, because of the unavoidable losses due to leakage and dead space; it is the higher relatively thereto, the lower the pressure to be maintained or, respectively, the higher the vacuum to be maintained will be. To maintain a pressure of 7.5 mm. Hg according to the example given, at least two to three hundred times the volume must be reckoned with in order to secure the same throughput as with the unit volume conveyed at atmospheric pressure. If the same throughput is to be obtained per unit time as at atmospheric pressure in a process in which a pressure of 7.5 mm. Hg must be maintained, a pump unit will be required which has two to three hundred times the capacity of a pump unit employed for the performance of the process effected at atmospheric pressure. Quite apart from the elevated investment costs, this causes operating expenditure for the pump unit per unit volume of the materials to be processed to be increased by the factor 200 to 300; accordingly, they determine the process costs alone in almost all cases, thus rendering the process uneconomical.

For this reason, industrial use of glow-discharge processes, particularly for uses in which large throughputs of materials to be processed were required, has so far been regarded as impossible and, respectively, as entirely uneconomical so that application of glow-discharge processes has to date been restricted to individual special uses.

The present invention has for its object to enable glow-discharge processes to be generally employed on an industrial level and, more particularly, to enable the chemical and physical processes performed under the action of a glow discharge to be made available for industrial large-scale application. In view of the fact that the uneconomical character of glow-discharge processes is not due to the nature of these processes but is the result solely of the large expenditure for equipment and the operation of the pump units required, which largely determines the operational costs, this invention was called upon to aim at substantially reducing the capacity of the pump unit required per unit volume of the materials to be processed and, along with it, of the investment and operational costs; in other words, to make the apparently impossible possible, i.e. to operate at a relatively low pressure and still to produce a glow discharge within the gaseous medium containing the materials to be processed or carrying them in finely dispersed form.

Accordingly, this problem was solved by means of a process for the performance of chemical or physical processes occurring under the action of a glow discharge in a gaseous medium containing the materials to be processed and, respectively, carrying them in finely dispersed form, in such a manner that zones of low gas density are created within a reaction vessel, in which zones the glow discharge is produced and through which the gaseous medium passes, at least one such zone being produced in which the gas density is at least temporarily so low relatively to the mean gas density of the gaseous medium, and an electrical field present at least in this zone which is at least temporarily so powerful that an electrical glow discharge is obtained at least intermittently.

This solution is based on the fundamental discovery that not pressure, but solely the gas density within a zone in which the glow discharge is to be produced will determine whether such a glow discharge can be obtained, and it consists in the application of the fact, known per se, that it is possible, within a gas, to produce continuously maintainable or periodically recurrent zones in which the gas density is substantially lower than the mean density of the gas.

In order to obtain a glow discharge, the gas density within the zone in which such glow discharge is to be produced must be below a certain value determined by the type of gas employed; more accurately speaking, the number of molecules or atoms contained in a unit volume in this zone must be below a certain level.

The reason therefore is that the mean free length of the path of an electron in a gas is inversely proportional to the number of molecules of the gas contained in a unit volume and that, in order to maintain a glow discharge, an electron must be capable of ionizing a gas molecule after moving over a mean free length of path.

If the number of molecules contained in a unit volume is too large and, respectively, the mean free length of path of the electrons, inversely proportional to this number, too small, the electron, after moving over this free length of path, which is too small, does not yet possess the energy required to ionize a gas molecule and no glow discharge can accordingly be set up.

Incidentally, this effect can readily be observed experimentally if pressure is raised with a glow discharge initially maintained, by way of example, at a pressure of 1 mm. Hg keeping the other operating parameters constant. When a certain upper limit value is reached, which may be in the magnitude of 30 mm. Hg, the glow discharge will be extinguished because the mean free length of path of the electrons has then become so short owing to the pressure increase that the electrons, when impinging on the gas molecules, do not possess on an average the energy required to ionize them.

In the event of the mean free length of path being too short, the energy of electrons may be increased by correspondingly raising the field intensity so that, on an average, the electrons possess an energy sufficient to ionize when they impinge on the gas molecules, but this possibility exists only within the field strength range in which a glow discharge can be set up at all. This is due to the fact that a glow discharge can be produced only within a certain field intensity range. If the field intensity exceeds this range, other discharges will occur, such as corona discharges, brush discharges or spark discharges.

It follows therefrom that in maintaining a field intensity which lies at the upper limit of the said field intensity range within which a glow discharge can be produced, and in continuously increasing the gas density owing to the steady reduction of the mean free length of path of the electrons caused thereby, the gas density must reach a level at which the glow discharge is extinguished.

Accordingly, a glow discharge can be produced only in a zone in which the number Z of the molecules contained in a unit volume is below a certain value $Z_{max}$.

This value $Z_{max}$ depends on the type of gas and amounts, for light gases such as nitrogen, oxygen, air, ammonia and carbon monoxide, and for the inert gases such as neon and argon to $Z_{max}=3\cdot10^{18}/cm.^3$. For hydrogen and helium, this value $Z_{max}$ is higher by about the factor 2, while it is substantially lower for heavier gases, such as high-molecular hydrocarbons or mercury vapour.

Now the number Z of the molecules or atoms contained in a unit volume at a pressure $p$ and at an absolute temperature T is the same for all gases and can be determined by dividing the number of molecules contained in a molar volume $V_m$, which is known to be equal to Loschmidt's number $L=6.02\cdot10^{23}$, by the molar volume $V_m$.

$$Z=\frac{L}{V_m}$$

It should be noted that a molar volume equals $$V_m\cdot=22.412$$

litres only under standard conditions, i.e. at a temperature $T_0=273°\,K.\triangleq0°\,C.$ and a pressure $p_0=760$ mm. Hg=1 atmosphere. In general, i.e. at any pressure $p$ and any temperature T, the magnitude of a molar volume $V_m$ is obtained from the general equation of state of gases $$p\cdot V_m=R\cdot T$$

$$V_m=R\cdot\frac{T}{p}$$

and it is thus proportional, together with the absolute gas constant $R=6.2197\cdot10^4$ mm. Hg cm.$^3/°$ K. as factor of proportionality, to absolute temperature and inversely proportional to the pressure.

Accordingly, the number of molecules contained in a unit volume $$Z=\frac{L}{V_m}=\frac{L}{R\cdot\frac{T}{p}}=\frac{p}{\frac{R}{L}\cdot T}$$

or, with the defining equation of Blotzmann's constants $k=R/L=1.0332\cdot10^{-19}$ mm. Hg. cm.$^3/°$ K.

$$Z=\frac{p}{kT}$$

It has previously been explained that a glow discharge can be produced only in a zone in which the number Z of the molecules contained in a unit volume is below a certain level $Z_{max}$, which, for the gases commonly employed in glow-discharge processes either as carrier gas or as a reaction component, with the exception of hydrogen and helium, is approximately $Z_{max}=3\cdot10^{18}/cm.^3$. Accordingly, in a zone in which a glow discharge is to be produced, the equation of condition $$Z=\frac{p}{kT}<Z_{max}.$$

$$\frac{p}{T}<k\cdot Z_{max}=0.31\,\frac{\text{Torr}}{°\text{K}.}$$

must at all events be fulfilled, i.e. only the ratio between gas pressure and gas temperature is the determining factor for the obtention of a glow discharge, and not the absolute value of gas pressure.

This may be demonstrated with particular clarity by the following example: If helium gas of which the condensation temperature is known to be about $-269°$ C. is cooled to a temperature of e.g. $-267°$ C.$\triangleq6°$ K., it will still be in gaseous condition and thus offer the possibility of producing a gas discharge. However, no glow discharge can be produced when a pressure of e.g. $p=5$ mm. Hg is applied because the above equation of condition which would be $$\frac{p}{T}<0.6\,\frac{\text{mm. Hg.}}{°\text{K}.}$$

for helium owing to its higher value of $Z_{max}$ is no longer fulfilled. This clearly shows that provision of a low pressure of e.g. $p=5$ mm. Hg alone is not sufficient to produce a glow discharge.

On the other hand, this relationship also renders it possible to obtain a glow discharge by substantially raising the gas temperature, at a pressure which is considerably above the pressure range within which a glow discharge can be produced according to the general concepts. This possibility and the provisions preferably made for its application are discussed in greater detail in the description of the drawing showing embodiments of the invention.

In connection with the equation of condition established for the obtention of a glow discharge it should be pointed out, however, that vagueness is observed, mainly in the older literature and in older patent specifications, in respect to the definition of the term "glow discharge" and that this term is employed for forms of discharge of which the physical behaviour is very different from that of a glow discharge and which show similarities to a glow discharge only in their outer appearance. Most frequently, such errors occur in the interpretations of diffuse corona discharges as may be observed at night on high-voltage power lines carrying 500 kv. and more. The degree to which this error of definition was general may, by way of example, be gauged by the textbook "Einführung in die theoretische Elektrotechnik" by K. Küpfmüller published in 1941 by Springer Verlag, Berlin, where it is stated, in the first four lines of page 77, that a glow discharge may occur on high-voltage power lines at atmospheric pressure, the word "corona" being added in brackets. This reference clearly reveals that no well-defined distinction was made at that time between the terms "corona discharge" and "glow discharge." A further example is found in the U.S. patent specification No. 2,185,070 published in 1939. In the process disclosed in this patent specification, hydration of high-molecular hydrocarbons is performed at a temperature of max. 675° F.$\triangleq$648° K. by means of dark high-frequency discharges inside mixing apparatus designed as Venturi tubes in which the high-frequency discharges are produced. The inventor states that a "corona or glow discharge" may be employed instead of high-frequency discharges, thus providing a clear example of the erroneous use of the term "glow discharge." Under the operating conditions recited and by means of the equation of condition for the obtention of a glow discharge as established above, it can be proved that production of a glow discharge in the apparatus described in the said specification is impossible, and this proof shall be given below to represent all erroneous uses of the term "glow discharge" as found mainly in the older literature.

In the Venturi tubes employed as mixing apparatus in the device described, the velocity of flow $c$ of the gas at the narrowest cross-section of the Venturi tubes may at best equal the sonic velocity of such gas because, as is well known, a de Lavall tube is necessary in order to obtain a gas flow of supersonic velocity.

With the equation $$c_s = \sqrt{\frac{p \cdot 1\alpha}{s}}$$

($c_s$=sonic velocity, $p$=gas pressure, $s$=mass of the gas per unit volume, $\alpha$=coefficient determined by the number of atoms contained in a gas molecule) relating to the sonic velocity of a gas and Bernoulli's theorem $p+\frac{1}{2}sc^2=p_0$ ($p_0$=pressure of gas at rest, $p$=pressure of the gas flowing at the velocity $c$, $s$=mass of the gas per unit volume) applying to a Venturi tube, the minimum pressure obtainable at the narrowest cross-section of a Venturi tube if the gas flows at its maximum flow velocity at this point, i.e. with the sonic velocity $c_s$, can easily be determined by introducing the sonic velocity of $c_s$ of the gas for its flow velocity $c$ into Bernoulli's equation:

$$p_0 + \tfrac{1}{2}sc^2 = p + \tfrac{1}{2}sc_s^2 = p + \tfrac{1}{2} \cdot \frac{p1\alpha}{s} = p\left(1 + \frac{1\alpha}{2}\right)$$

It follows that $$p = p_0 / \left(1 + \frac{1\alpha}{2}\right)$$

and since $\alpha$ equals 1.66 for monoatomic gases and 1.4 for diatomic gases, 1.33 for triatomic gases and gradually approaches the value 1 for the greater number of atoms, the coefficient may be approximated to 1 for the multiatomic gases employed in the apparatus considered so that the minimum pressure is $p=0.666\ p_0$. The vapour pressure present at the inlet of the Venturi tubes may be considered to be the pressure $p_0$ of the gas at rest which, according to the operating conditions indicated, is somewhat above atmospheric pressure, i.e. at $p=760$ mm. Hg. Accordingly, the minimum pressure level inside the Venturi tubes $p=0.666\ p_0=507$ mm. Hg and since, as previously stated and indicated as operating condition, the vapour temperature may not exceed a maximum of 675° F.$\triangleq$375° C.$\triangleq$648° K., it must be examined, by insertion in the equation of condition for the obtention of a glow discharge $$\frac{p}{T} < 0.31 \frac{\text{mm. Hg.}}{°\ \text{K.}}$$

whether a glow discharge can be produced at a gas temperature $T=648°$ K. and a pressure $p=507$ mm. Hg. The result of this examination $$\frac{507 \text{ mm. Hg.}}{648°\ \text{K.}} = 0.782 \frac{\text{mm. Hg.}}{°\ \text{K.}} < 0.31 \frac{\text{mm. Hg.}}{°\ \text{K.}}$$

clearly indicates that the equation of condition is not fulfilled and that accordingly no glow discharge can be produced in the apparatus described in U.S. patent specification No. 2,185,070 under the operating disclosed conditions for the process described. The author's statement that a "corona or glow discharge" could also be employed instead of the high-frequency discharges employed in the process disclosed must therefore be considered to be an erroneous interpretation of the term as was to be demonstrated and has hereby been proved; this misinterpretation was formerly often met with owing to the similarity of the appearance of diffuse corona discharges and glow discharges.

The transition from a glow discharge into another form of discharge with increasing gas density naturally does not occur spontaneously when the maximum value obtained by the above equation of condition for $p/T$ is exceeded, but it is gradual and starts already at considerably lower $p/T$ values, i.e. at levels about one magnitude lower than the maximum value. In order to obtain a glow discharge, satisfaction of the above equation of condition is a necessary condition which is not in all cases sufficient. The above equation of condition only provides the certainty that a glow discharge at $p/T$ levels above the minimum value indicated by the equation will in no event be possible. The form of this transition may, by way of example, be seen in Fig. 267 on page 562 of the textbook "Fundamental Processes of Electrical Discharge in Gases" by L. B. Loeb, published by John Wiley & Sons, Inc., New York, 2nd edition, December 1947. This figure 267 shows the physical appearance of a glow discharge including the transition into a spark discharge for air as the medium in dependence on pressure, i.e. for the pressure of 0.1 mm. Hg in Fig. E, 1 mm. Hg in Fig. D, 5 mm. Hg in Fig. C, 20 mm. Hg in Fig. B and 100 mm. Hg in Fig. A and at a standard temperature of $T \triangleq 293°$ K.$=20°$ C. For the values of $p/T$, we find, in the same order $$0.000342 \frac{\text{mm. Hg}}{°\ \text{K.}}$$

in Fig. D $$0.0171 \frac{\text{mm. Hg}}{°\ \text{K.}}$$

in Fig. C $$0.0684 \frac{\text{mm. Hg}}{°\ \text{K.}}$$

in Fig. B and $$0.342 \frac{\text{mm. Hg}}{°\ \text{K.}}$$

in Fig. A. For the value $p/T$ in Fig. A, the equation of condition for a glow discharge is not satisfied as may be seen from the thread-type course of the discharge in Fig. A and as indicated by the word "spark" underneath Fig. A. On the other hand, Fig. B shows a glow discharge although the beginning of transition to another form of discharge is clearly noticeable. This also tallies with the above findings that transition from the glow discharge to some other form of discharge starts at a $p/T$ level which is lower approximately by one magnitude than the maximum value given by the equation of condition, for the value of $p/T$ in Fig. B is lower, with $$0.0684 \frac{\text{mm. Hg}}{°\ \text{K.}}$$

by only the factor 4.5 and thus by less than one magnitude than the maximum value of $$0.31 \frac{\text{mm. Hg}}{^\circ \text{K.}}$$

On the other hand, no tendency to transition to some other form of discharge can be observed in Figs. E, D and, particularly, C in which the $p/T$ values are lower by one magnitude than the maximum value $$0.31 \frac{\text{mm. Hg}}{^\circ \text{K.}}$$

throughout.

It should therefore be attempted, within the zones of low gas density created in the reaction vessel in which the glow discharge is to be produced, to obtain $p/T$ values which are lower by at least the factor 2, preferably at least by one magnitude, than the maximum values of $p/T$ given.

In this connection, it is again pointed out that the equation of condition given for the obtention of a glow discharge $p/T < 0.31$ mm. Hg/° K. is applicable only to light gases such as nitrogen, oxygen, air, ammonia and carbon monoxide, that the equation of condition for hydrogen and helium must be about $p/T < 0.6$ mm. Hg/° K. and that the maximum value of $p/T$ is substantially lower than 0.31 mm. Hg/° K. for heavier gases such as high-molecular hydrocarbons. The method of this invention according to which zones of lower gas density are formed within the reaction vessel instead of fully evacuating the said vessel, through which the gaseous medium containing the materials to be processed passes, the said zones of lower gas density being produced in application of physical effects known per se, enables the gaseous medium to be supplied to the reaction vessel with a relatively high gas density and, respectively, at a relatively high pressure, and to be removed at approximately the pressure under which it was supplied after it has passed the zone of lower gas density with substantially the same relatively high gas density, so that the pumping power required per unit quantity of the materials to be processed and the investment and operating costs of the pump unit can be substantially reduced.

A number of embodiments of the invention are discussed to show what physical effects may be used in the practice according to this invention in conjunction with the attached drawing, in which:

FIG. 1 shows a device for the performane of the method according to this invention which uses the physical effect of obtaining zones of temporarily lower gas density in a sound wave produced;

FIG. 2 is a diagram of the pressure distribution within the device according to FIG. 1;

FIG. 3 shows a device for the performance of the process according to this invention which uses the physical effect of reducing gas density in zones of higher temperature;

FIGS. 4, 5 and 6 show other embodiments of a reaction tube for a device according to FIG. 3;

FIG. 7 shows a device for the performance of the method according to this invention which uses the effect of forming a zone of lower gas density observed with a jet pump, and FIG. 8 is a diagram of the pressure distribution within a device according to FIG. 7.

Referring now to the drawing and, more particularly, to FIG. 1, a device for the performance of the method according to this invention is shown in which zones of temporarily lower gas density are obtained by propagating sound waves in the gas. The reaction vessel here consists of the reaction duct 1 of, by way of example, circular cross-section, and the inlet chamber 3 and the outlet chamber 4. The reaction duct 1 enclosed by the metallic wall 2 connects the inlet chamber 3 to the outlet chamber 4 so that the gaseous medium containing the materials to be processed and supplied to the inlet chamber 3 may flow via the line 5 to the outlet chamber 4 and leave the same through the line 6. The throughput of the medium is so adjusted to the dimensions of the duct 1 that the pressure difference between the inlet chamber 3 and the outlet chamber 4 may virtually be disregarded, i.e. that the gas pressure $P_a$ exists in both chambers.

Coaxially arranged in the front portion of the reaction duct 1 is a metallic interior electrode 7 which is connected to the outside, by the two metal tubes 8 and 9, in insulated relationship to the metal wall 2 of the reaction duct 1. The tubes 8 and 9 enable a flow of cooling water to be passed through the inner electrode 7. The leads 10 and 11 enable an electrical direct or alternating potential to be applied between the interior electrode 7 and the metal wall 2. If desired, the interior electrode 7 may also be longer than shown in FIG. 1 and extend throughout the length of the reaction duct 1.

In order to produce, within the gaseous medium flowing through the reaction duct 1, one or several zones having temporarily lower gas density relative to the mean gas density of the gaseous medium, the reaction duct 1 is subjected to the action of sound waves of which the frequency is so adjusted to the dimensions of the duct that they will produce a standing wave within the duct 1. In FIG. 1, the oscillation generator is designed as a diaphragm 12 inserted in the wall of the inlet chamber 3, the said diaphragm being actuated by an electromagnet 13 to the leads 14 of which an alternating current is supplied. The inlet chamber 3 and the outlet chamber 4 are so designed according to the known oscillation principles that the standing wave is set up in the duct 1 only while moving waves are produced to the extent possible in the chambers 3 and 4.

The pressure distribution obtained within the reaction duct when excited by a sound wave of which the wavelength equals the length of the reaction duct is represented between the points E and A in the diagram of FIG. 2, corresponding to the inlet and outlet respectively of the duct 1. At these points E and A and at the vibration node M at the centre of the duct, the constant pressure $P_a$ is obtained, while the pressure at all other points of the reaction duct 1 fluctuates periodically between the minimum pressure $P_0$ and the maximum pressure $P_m$ between the points E and M and, respectively, M and A. Accordingly, two low-pressure zones $s1$ and $s2$ with a pressure between $P_0$ and $P_z$ are thus present, at least temporarily, along the reaction duct 1.

The pressure distribution indicated diagrammatically in FIG. 2 naturally does not make allowance for the presence of the interior conductor 7 in the duct 1, but the said conductor causes only a certain distortion of the pressure distribution. If a direct voltage of appropriate magnitude is applied between the interior conductor 7 and the metallic wall 2 an electrical glow discharge may be set up in the reaction duct 1 during the time interval in which the zone $s1$ possesses a sufficiently low pressure. The intensity of the discharge will display periodical changes and a behaviour similar to that of a glow discharge at constant pressure and an alternating voltage supply. In the present case, too, an alternating voltage may be applied to the leads if it is synchronous with the generating voltage applied to the leads 14 and possesses the proper phase relationship to the stationary pressure wave.

At all events, however, and with a sufficiently powerful excitation by the sound source 12, 13, 14 and a correspondingly wide amplitude, caused by this powerful excitation, of the pressure wave superimposed on the mean pressure $P_a$ in the reaction duct 1, one or several periodically recurrent low-pressure zones may be obtained. With the energizing frequency properly adjusted to the length of the reaction duct 1, a stationary sound wave may be generated within the reaction duct; in the case represented in FIG. 1, a so-called "gas column open on either side," is produced, provided that the length L of the reaction duct 1 is $$L = k \cdot \frac{\lambda}{2}$$

$\lambda$ being the wave-length of the energizing frequency and $k$ a whole positive number $k=1, 2, 3 \ldots$. If $k=1$ and, accordingly $$L = \frac{\lambda}{2}$$

a "half-wave excitation" is obtained.

For the event that the reaction duct 1 is closed by an apertured partition where it opens into the outlet chamber 4 (the former may be designed as a partition closing the reaction duct and provided with a hole having a substantially smaller diameter than that of the reaction duct for the passage of the gaseous medium into the outlet chamber 4), i.e. in the event of a so-called gas column closed on one side, a sound wave will be formed on the condition that the length of the reaction duct is $$L = (2k-1)\frac{\lambda}{4}$$

The symbol $k$ here again stands for a whole positive number $k=1, 2, 3 \ldots$. For $k=1$, i.e.

$$L = \frac{\lambda}{4}$$

the term "quarter-wave excitation" is employed.

A standing sound wave may generally be obtained in the reaction duct whenever $$L = k \cdot \frac{\lambda}{4}$$

the reaction duct being closed at the outlet by means of an apertured partition for all uneven values of $k$ ($K=1, 3, 5 \ldots$) ("natural oscillation of a gas column closed at one side"), and open at the outlet for all even values of $k$ ($k=2, 4, 6 \ldots$) as shown in FIG. 1 ("natural oscillation of a gas column open at either side").

With the generally known relationship between the velocity of sound $c$, the wave-length $\lambda$ and the frequency $f$ of an acoustic oscillation $$f = \frac{c}{\lambda}$$

and the above relationship between the length of the reaction duct L and the wave-length $\lambda$, the excitation frequency $f$ may be determined by which the sound source 12, 13, 14 must be excited in order to produce a stationary wave at a given length L of the reaction duct, $$f = \frac{c \cdot k}{4L}$$

Where the outlet of the reaction duct is open, $k$ must be a whole even positive number, and a whole uneven positive number where it is closed by means of an apertured partition. The frequency found for the lowest $k$ value, i.e. where the outlet of the reaction duct is open, the frequency found for $k=2$, where the reaction duct is closed by an apertured partition, the frequency found for $k=1$ is generally designated as the fundamental frequency of the cavity resonator or resonant cavity formed by the reaction duct, while the frequencies found for all higher $k$ values are regarded as the harmonic frequencies of the cavity resonator. When such a standing sound wave is produced, a stationary pressure wave is superimposed on the mean pressure in the cavity resonator, in the present case on the mean pressure $P_a$ of the gaseous medium in the reaction duct 1, the said wave satisfying the equation $$p(t, x) = P_a + \Delta P \sin \omega t \cdot \sin \frac{k\pi}{2} \cdot \frac{x}{L}$$

if $p(t, x)$ designates the pressure present at point $x$ at the time $t$; $P_a$ the mean pressure, P the maximum amplitude of the stationary pressure wave, $\omega=2\pi f$ the angular frequency of the sound source, $x$ the distance between the point observed and the entrance to the reaction duct located at the passage from the inlet chamber 3 and the reaction duct 1, and L the length of the reaction duct. Where the reaction duct is open at the outlet, $k$ must be a whole even positive number and a whole uneven positive number where it is closed by an apertured partition.

The angular frequency $\omega=2\pi f$ of the sound source must furthermore satisfy the equation of condition above derived for the excitation frequency, $$\omega = 2f\pi = 2\pi \cdot \frac{ck}{4L} = \frac{k\pi}{2} \cdot \frac{c}{L}$$

The above equation for $p(t, x)$ is therefore often found in the form $$p(t, x) = P_a + \Delta P \sin \frac{k\pi}{2} \cdot \frac{ct}{L} \text{sind} \frac{K\pi}{2} \cdot \frac{x}{L}$$

in which it is, however, less clear. In contradistinction, the first-named equation for $p(t, x)$ is more suitable for explanation. If $k=4$ is introduced into this equation e.g. for the pressure wave shown in FIG. 2, the equation $$p(t, x) = P_a + \Delta P \sin \omega t \sin 2\pi \cdot \frac{x}{L}$$

is obtained. This equation shows that the second term of sum representing the stationary pressure wave is dependent on both place and time. At a certain point $x$, the amplitude of the pressure oscilliation $\Delta P$ generated is $$2 \sin \pi \frac{x}{L}$$

At this amplitude, the pressure $p$ oscillates about the mean value $P_a$ at the frequency $$f = \frac{\omega}{2\pi}$$

and at the times $$t = \frac{1}{\omega}\left(\frac{\pi}{2} + 2n\pi\right)$$

with $n=0, 1, 2 \ldots$ reaches the value $$p = P_a + \Delta P \sin 2\pi \frac{X}{L}$$

and at the times $$t = \frac{1}{\omega}(3\pi + 2n\pi)$$

the value $$P_a - \Delta P \sin 2\pi \frac{X}{L}$$

while the pressure at all times $$t = \frac{n\pi}{\omega}$$

at any point $x$ is $p=P_a$ because sin $\omega t$ equals 0 at all these times.

In the present case the presence—at least temporary—of a zone with the lowest possible pressure $p$ relative to the pressure $P_a$ is of particular interest. It must therefore be examined when and where a minimum pressure exists. As the amplitude of the sound oscillation generated at a certain point $x$ amounts to $$\Delta P \sin 2\pi \frac{X}{L}$$

a maximum amplitude is found at the points $$x = \frac{1}{4}L$$

and $$x = \frac{3}{4}L$$

as $$\sin 2\pi \frac{x}{L} \text{ equals } 1 \text{ and } -1$$

respectively at these points. The pressure $p$ at the point $$x = \frac{1}{4}L$$

is therefore $p = P_a + \Delta P \sin \omega t$ and at the point $$x = \frac{3}{4}L$$

the value $p = P_a - \Delta P \sin \omega t$. At the times $$\left( t = \frac{1}{\omega} + 2n\pi \right)$$

and at the point $$x = \frac{3}{4}L$$

and at the times $$t = \frac{1}{\omega}\left( \frac{3\pi}{2} + 2n\pi \right)$$

at the point $$x = \frac{1}{4}L$$

a pressure minimum will occur of which the value will be $p = P_a - \Delta P$ in either case.

The level of the maximum amplitude $\Delta P$ in the ideal case, i.e. with a total reflection of the pressure surge at the ends of the cavity resonator and when the attenuation of the pressure wave during the reciprocatory movement through the cavity resonator, i.e. through the reaction duct 1 in the case under consideration is equal to $x$ to 0, is equal to the value $\Delta P = P_a$. In this ideal case the standing sound wave would be automatically maintained also upon a single impulse, in the form of a so-called unattenuated oscillation. In practice, however, it is possible neither to obtain total reflection nor to zeroize the attenuation of the wave.

In order to keep the difference $P_a - \Delta P$ as small as possible and thus to obtain the lowest possible value of the intermittently present pressure minimums $p = P_a - \Delta P$, attenuation of the cavity resonator must, in the first place, be kept as low as possible and the pressure wave must, in the second place, be reflected as completely as possible by the two ends of the cavity resonator.

Both the attenuation by the cavity resonator and incomplete reflection remove energy from the pressure wave which produces, in the case of attenuation, frictional heat within the gaseous medium itself and on the wall of the cavity resonator and, in the event of incomplete reflection, radiation energy at the ends of the cavity resonator.

Total reflection may be obtained in a cylindrical cavity resonator if either the ends of the cylinder are open and communicate with a non-reflecting chamber containing a stationary gas continuum or if they are firmly closed by lids; both ends may be open or both closed, or one end may be open and the other closed. Friction within the gaseous medium itself cannot be avoided. Friction on the wall of the cavity resonator may be kept low by making the inner wall of the cavity resonator as smooth as possible, e.g. by polishing of plating it with a surfacing applied by way of electrolysis.

If these principles are applied e.g. to the arrangement shown in FIG. 1, the inlet chamber 3 and the outlet chamber 4 must be as non-reflecting as possible, which may be achieved by appropriately lining these chambers with a suitable absorptive material or by considerable roughness of the walls. In the second place, a gas continuum as stationary as possible must be present in both the inlet chamber 3 and the outlet chamber 4, which may be obtained by sufficient dimensions of these chambers and by a sufficiently low flow velocity of the gaseous medium; thirdly, the inner wall of the reaction duct must be as smooth as possible, it also being necessary for the material of the inner wall not to be attacked by the chemical reactions contemplated.

The source of sound 12, 13, 14 must further be in a position to give off at least as much radiation as is continuously lost by attenuation and the reflection losses as well as by the radiation energy losses in the inlet chamber 3.

If all these preconditions are met a standing pressure wave having a maximum amplitude of $\Delta P = 495$ mm. Hg can be obtained at a mean pressure $P_a = 500$ mm. Hg in the reaction tube 1. At the points $x = \frac{1}{4}L$ and $x = \frac{3}{4}L$ and in their immediate vicinity, low-pressure zones recurring with the sonic frequency will be obtained in which the pressure reaches the minimum value $p = P_a - \Delta P = 5$ mm. Hg at different times spaced by one-half of the duration of oscillation of the sound wave.

The pressure in these periodically recurrent low-pressure zones during a certain period, which is in the magnitude of one tenth of the period of oscillation of the sound wave, is in the pressure range between 5 and 30 mm. Hg, i.e. in the range which is particularly suitable for the production of an electrical glow discharge. The frequency of the sound wave may be, by way of example, 100 cycles; when air is employed as the gaseous medium, the length of the reaction duct 1 in the case represented by FIGS. 1 and 2 must be about 3.2 m. (not a full 3.3 m. owing to Helmholtz' reduction of the tube length). In the case of half-wave excitation the length of the duct would have to be about 1.6 m. and for quarter-wave excitation about 0.8 m. Naturally lower or higher sound frequencies up to ultrasonic range may be employed; with substantially higher frequencies, excitation of the reaction duct serving as the cavity resonator being advantageously effected at one of its harmonics.

The device according to FIG. 1 may not only be employed, as described above, for the production of a low-pressure zone by excitation of a standing sound wave. A low-pressure zone may also be obtained by means of a periodic sound wave traversing the reaction duct 1, in which case the interior electrode 7 will advantageously extend over the full length of the duct 1. The low-pressure zone traversing the duct 1 enables a concurrent glow discharge to be produced. As the velocity of propagation of the low-pressure zone amounts to about 300 m./sec., the much lower gas stream passing through the duct 1 is traversed by a plurality of periodically consecutive glow discharges. The sinusoidal sound waves may also be replaced by pressure pulses (shock waves) which may be produced by periodical spark discharges or in any known manner. The propagation of such advancing pressure waves may be directed in the direction of flow of the medium or in the opposite direction.

The device shown in FIG. 3 for the performance of the process according to the present invention is based on the fact that only the gas density and, respectively, the ratio between gas pressure and gas temperature is the determining factor for the obtainability of a glow discharge, while the absolute value of the gas pressure is immaterial.

As follows from the equation of condition for the obtainability of a glow discharge, $p/T<0.31$ mm. Hg/°K., which has been discussed in great detail above, when the absolute gas temperature T is raised by a certain factor in a zone in which a glow discharge is maintained, the gas pressure, too, may be raised by the same factor without stopping the glow discharge.

If a glow discharge can be obtained, by way of example, within a gas having a gas temperature of 293° K., i.e. the standard temperature of 20° C., and under a pressure of 40 mm. Hg, the gas pressure can be increased to 273 mm. Hg when the gas temperature is raised to, say, 2000° K. or 1727° C. without extinguishing the glow discharge, because the ratio between gas pressure and gas temperature at the high temperature and at high pressure $p/T=273$ mm. Hg/2000° K.=0.1365 mm. Hg/° K. is the same as with the low temperature and the low pressure $p/T=40$ mm. Hg/293°/ K.=0.1365 mm. Hg/° K. so that the gas density, which is the sole factor determining the obtainability and maintainability of a glow discharge is the same in both cases.

This possibility is utilized in the device according to FIG. 3 in such a manner that a zone of high gas temperature is produced within the reaction vessel through which the gaseous medium is caused to travel. To this end, the reaction vessel is divided into an inlet chamber 20 and an outlet chamber 21 by means of the partition 23 formed of an electrical insulating material, the said chambers communicating only by the metal tube 22 extending through the partition 23. The gaseous medium suplied through the line 28 of the inlet chamber, which contains the materials to be processed, must therefore flow through the metal tube 22 in order to reach the outlet chamber 21 whence it is removed through line 29.

Inside this metal tube 22 the flowing gaseous medium is heated so as to form a zone having a gas density sufficiently low to produce and maintain a glow discharge. The velocity of flow of the gaseous medium through the metal tube 22 must be so adjusted that the gas temperature of the gaseous medium is raised sufficiently to maintain a glow discharge already after travelling through part of the metal tube 22. The flow velocities so obtained are comparatively low so that the pressure in the metal tube 22 is approximately the same as in the inlet chamber 20 and in the outlet chamber 21. There is virtually no pressure drop between the gas in the metal tube 22 and that in the inlet and outlet chambers.

The metal tube 22 is designed as an electrode and connected to the lead 27 via a support insulated relatively to the metal wall of the reaction vessel 24. The counterelectrode is formed by the interior electrode 25 which extends through the metal wall 24 of the reaction vessel in insulated relationship and connected to the lead 26. The interior electrode 25 may, if desired, be cooled by a coolant flow supplied and removed through the lines 30 and, respectively, 31. The glow discharge maintained between these two electrodes in operation at the same time causes the gas temperature of the gaseous medium to rise while it travels through the metal tube 22 and thus automatically maintains the low gas density that is required for its own continuance.

At the beginning of operation of such a device the low density must at first be produced in some other manner because the gas temperature within the metal tube is at that time about the same as standard temperature. Accordingly, a gas pressure of, say, 10 mm. Hg is set in the two chambers 20 and 21 at the beginning of operation while the supply and exhaust lines 28 and 29 are closed and without cooling the interior electrode 27, and a direct or alternating voltage of about 500 volts applied to the leads 26, 27. This will cause a glow discharge to be produced in the tube 22 of which the intensity can be raised to levels so high by increasing the operating potential at the leads 26, 27 that a temperature between about 1000 and 2000° C. is generated in the metal tube 22. The inlet 28 and the outlet 29 may then be opened and the pressure in the chambers 20 and 21 increased, by way of example, to 250 mm. Hg without causing the electrical glow discharge in the tube 22 to be extinguished. Owing to the high temperature obtaining in the tube 22, the gas density is there substantially lower than in the two chambers 20 and 21, which is maintained by the glow discharge itself. After this operating condition has been reached, the medium to be processed may be supplied, via the line 28, to the inlet chamber 20 while the higher pressure level in the chambers 20 and 21 is maintained, and hence it will travel, via the discharge zone of lower gas density in the tube 22, into the outlet chamber 21 which it will leave through the line 29. When passing through the high-intensity glow discharge in the tube 22, the desired reaction will take place in the medium.

It is important for the operation of the device according to FIG. 3 that the necessary high temperature is produced and maintained in the tube 22. This may also be achieved by preheating the interior electrode 25 as by an electrical resistance heating device. A further possibility is illustrated in FIG. 4 which shows a tube 22 having several narrow annular channels 32 in its inner wall. The width of these annular channels 32 is such as to cause an electrical hollow-cathode discharge to be set up at the operative gas density maintained in the tube 22, to which end the tube 22 at least temporarily operates as a cathode. In a device according to FIG. 5 the gaseous medium may also be supplied to the tube 22 direct via a hollow interior electrode 33 as shown in FIG. 5 so that the medium can be removed through both the lines 29 and 28.

The reaction tube 22 in the device of FIG. 3 may be replaced by the jet discharge tube according to FIG. 6. This tube consists, by way of example, of a metallic double-walled body 34 with a central reaction duct 35 open at both ends. From the annular chamber 36, which is supplied with a gas flow through the line 37, a plurality of radially inwardly directed nozzle-type bores 38 leads into the reaction duct 35. Arranged outside the jet discharge tube are the counterelectrodes, which are here designed as metal rings. If a direct or alternating voltage of sufficient power of, say, over 400 volts is applied between the jet discharge tube and the counterelectrode and a sufficiently abundant gas stream introduced through the tube 37, an intensive electrical discharge will be produced by the individual gas jets in the duct 35, which discharge will cause the jet discharge tube and the gaseous medium traveling therethrough to be powerfully heated. This will produce a zone of low gas density in the jet discharge tube, in which a glow discharge in the form of a jet discharge can be maintained. The term jet discharge is here used to denote the form of discharge in which a gas jet emerging from a nozzle is ionized by the action of an electrical field so that a glow discharge is formed which is freely located in the chamber and limited by the jet. (The glow discharge produced displays the same characteristic features as an electrical glow discharge in a stationary medium.)

FIG. 7 finally shows a device similar to a jet pump in which a nozzle 40 formed of an insulating material and a suction tube 41 also formed of an insulating material are arranged in a metal tube 42. If a gas stream of high velocity of flow is passed through the nozzle 40, it will produce, owing to its injecting action, a zone of lower pressure in the tube 42, at least in the annular space in the vicinity of the wall, the said zone being suitable for producing a glow discharge. For this purpose, a direct or alternating voltage of appropriate power, such as 450 volts, is supplied between the tube 42 on the one hand and a counterelectrode, e.g. the metal ring 43, on the other via the leads 44 and 45.

In the low-pressure zone which encloses the gas jet emerging from the nozzle 40 and which is under a pressure nearing the minimum level $P_0$ according to FIG. 8, the gaseous medium can be supplied as via the annular line 46 which communicates with the interior of the tube 42 via nozzle-type bores. In this case, the gas jet producing the low-pressure zone and supplied through the nozzle 40 may be an inert gas, e.g. a rare gas. If desired, the gas flowing through the nozzle 40 may also contain the materials to be processed, or carry them in finely dispersed form.

The possibility of producing zones of lower gas density in a gas atmosphere of a certain mean gas density, and of generating an electrical discharge by superimposing an electrical field in the zones having a lower gas density, has been demonstrated with reference to the devices disclosed and represented diagrammatically. A novel method has thus been shown of solving the problem of performing a chemical or physical process in a gas atmosphere under the action of an electrical glow discharge without necessitating the permanent maintenance of an undesirably low gas pressure in the reaction space. This method may be applied to gaseous media containing the materials to be processed (e.g. in the form of gases, gas mixtures and vapours) or carrying them along in finely dispersed form (e.g. in the form of solid and/or liquid substances in finely dispersed form, such as powders or mists). The chemical processes may comprise reductions, oxidations, hydrations, dissociations and polymerizations. The method is also applicable to metallurgical processes, such as the manufacture of pure or alloyed metals of solid, liquid or gaseous metalliferous compounds. Other technical processes may also be performed in the manner disclosed.

What I claim is:

1. A method of producing a glow discharge in a gaseous medium comprising the steps of: feeding said gaseous medium through a treatment zone at a pressure too high to sustain a glow discharge; establishing an electric field across said zone; and treating at least a portion of said gaseous medium in said zone to reduce the density thereof and thereby produce a glow discharge in said portion of reduced density.

2. The method of claim 1 wherein the density of said portion is reduced by heating and thereby expanding the same.

3. The method of claim 2 wherein said heating step is performed within a reaction duct in said zone and through which said gas is passed.

4. The method of claim 3 wherein said electric field is established across said duct between electrodes, one of said electrodes being heated to red heat, by resistance heating, for heating said gas.

5. The method of claim 1 wherein the density of said portion is reduced by establishing a standing sound wave in the gas in said zone whereby to intermittently produce reduced pressure and density in at least one part of said zone.

6. The method of claim 5 including the step of directing a stream of said gas through a restricting reaction duct in said zone, pressure waves traveling along said duct producing said lower density in said position.

7. The method of claim 6 wherein said electric field is established in said duct by using said duct as the cathode whereby a hollow-cathode glow discharge is produced.

8. The method of claim 1 wherein the density of said portion is reduced by causing such relative motion between said portion and an adjacent portion as to reduce the pressure of said portion.

9. The method of claim 1 wherein the density of said portion is reduced by substantially confining said portion in a limited space in said zone and passing a stream of said gaseous medium therepast to aspirate some gas from said portion and thereby reduce the pressure and density thereof.

10. The method of claim 5 wherein said standing sound wave is of such amplitude as to produce a reduced pressure of from 1 to 50 mm. Hg.

11. The method of claim 5 wherein said zone comprises an acoustically resonant chamber and wherein the frequency of said standing wave is a whole positive number times the resonant frequency of said chamber.

12. The method of claim 5 including the step of establishing said electric field by an alternating voltage the frequency of which is equal to that of said standing wave.

References Cited by the Examiner
UNITED STATES PATENTS

| | | | |
|---|---|---|---|
| 2,185,070 | 12/1939 | Stevens | 204—312 X |
| 2,582,903 | 1/1952 | Guanella et al. | 204—312 |
| 2,955,998 | 10/1960 | Berghaus et al. | 204—312 X |

JOHN H. MACK, *Primary Examiner.*

JOHN R. SPECK, WINSTON A. DOUGLAS, *Examiners.*